S. BAXLEY.
COTTON CHOPPER.
APPLICATION FILED JULY 19, 1912.
1,059,107.
Patented Apr. 15, 1913.
2 SHEETS—SHEET 1.
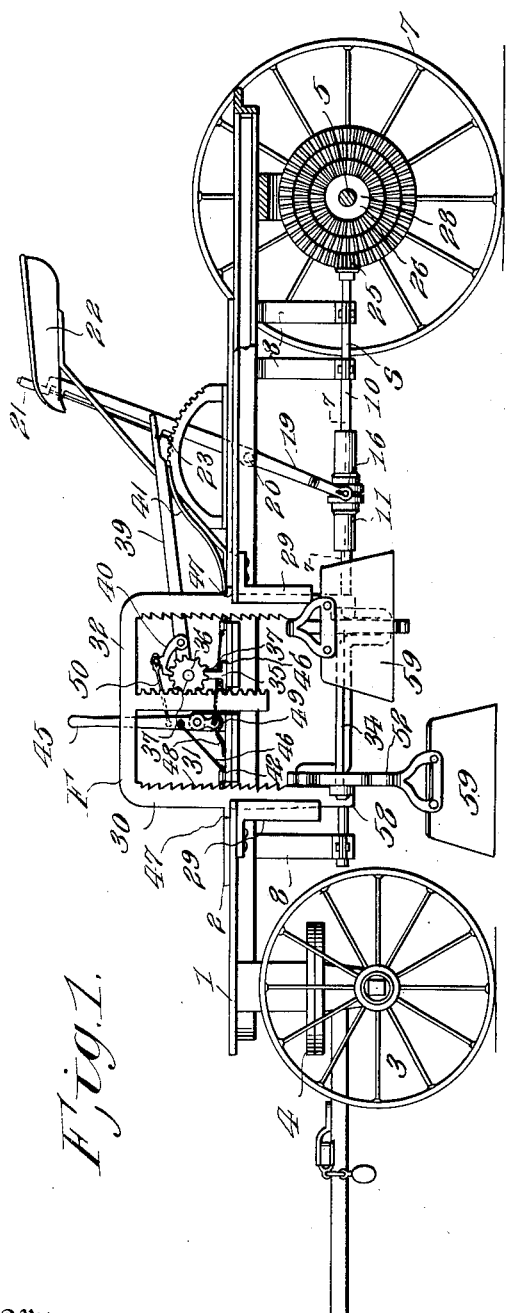
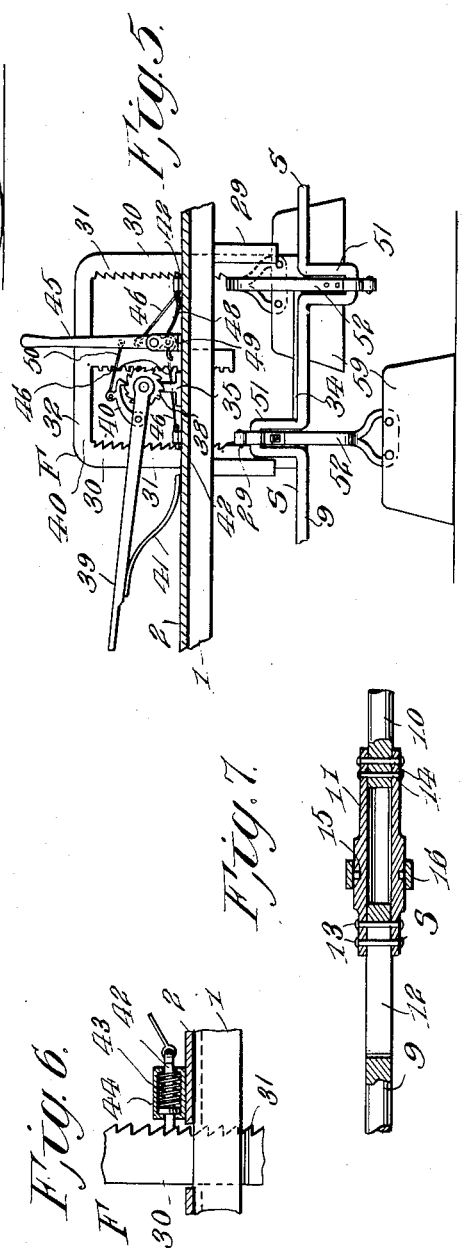
Witnesses
Frank Hough
Inventor
Spurgeon Baxley,
By Victor J. Evans
Attorney

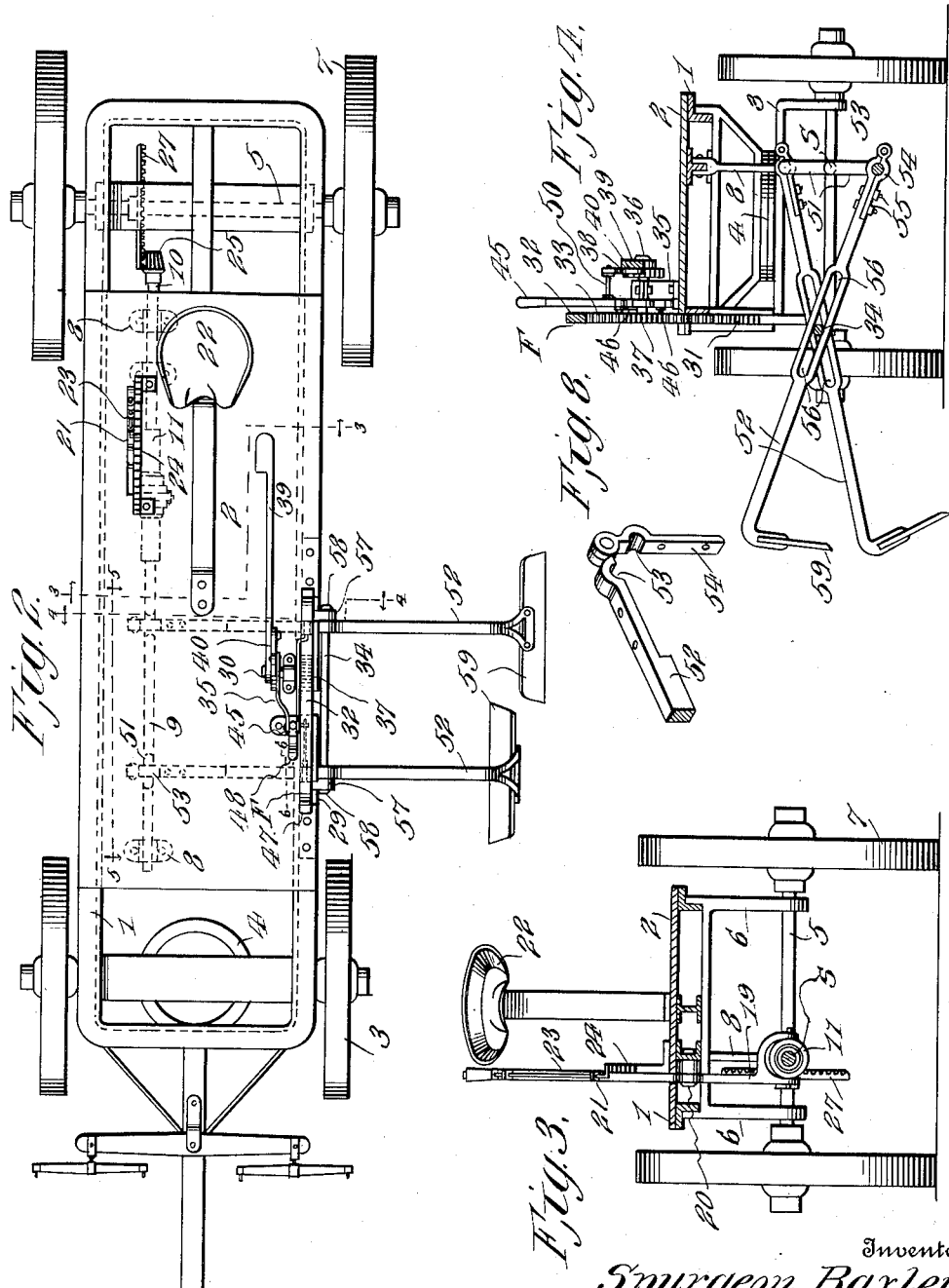

UNITED STATES PATENT OFFICE.

SPURGEON BAXLEY, OF WILMINGTON, NORTH CAROLINA.

COTTON-CHOPPER.

1,059,107.

Specification of Letters Patent. Patented Apr. 15, 1913.

Application filed July 19, 1912. Serial No. 710,448.

*To all whom it may concern:*

Be it known that I, SPURGEON BAXLEY, a citizen of the United States, residing at Wilmington, in the county of New Hanover and State of North Carolina, have invented new and useful Improvements in Cotton-Choppers, of which the following is a specification.

This invention relates to machines for chopping cotton, and it has particular reference to that class of cotton choppers which are provided with a plurality of hoes operating transversely of the row of plants and deriving motion from the transporting wheels of the machine.

One object of the invention is to produce a machine of simple and improved construction having convenient and easily operable means whereby the chopping hoes may be moved to and from ground engaging position and whereby they may be sustained at various adjustments to operate at the desired depth.

A further object of the invention is to produce a machine of the class described having simple and efficient means for actuating the hoes.

With these and other ends in view which will readily appear as the nature of the invention is better understood, the same consists in the improved construction and novel arrangement of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the claims may be resorted to when desired.

In the drawings,—Figure 1 is a side elevation of a machine constructed in accordance with the invention, the near hind wheel having been removed. Fig. 2 is a top plan view. Fig. 3 is a transverse sectional view taken on the line 3—3 in Fig. 1. Fig. 4 is a transverse sectional view taken on the line 4—4 in Fig. 1. Fig. 5 is a detail view in sectional elevation taken on the line 5—5 in Fig. 2. Fig. 6 is a sectional detail view enlarged, taken on the line 6—6 in Fig. 2. Fig. 7 is a sectional detail view of a portion of the operating shaft taken on the line 7—7 in Fig. 1. Fig. 8 is a perspective detail view illustrating the manner of connecting the hoe with the crank of the operating shaft.

Corresponding parts in the several figures are denoted by like characters of reference.

The rectangular main frame 1 having the platform 2 is supported at its front end on a truck 3 including a fifth wheel 4 of suitable construction to enable the machine to make a short turn. The hind axle 5 which is supported for rotation in brackets 6 depending from the frame of the machine carries the transporting wheels 7.

Supported for rotation in brackets 8 depending from a platform is a longitudinal shaft S which is composed of two sections 9 and 10, one of which, 10, carries a sleeve 11 in which the shaft section 9 telescopes, said shaft section 9 being provided with a slot 12 for the passage of connecting members such as bolts or rivets 13 passing diametrically through the sleeve with which the shaft section 9 is thus connected for rotation. The sleeve 11 is firmly secured on the shaft section 10 by fastening members 14. The sleeve has an annular groove 15 forming a seat for a ring or collar 16 which is suitably connected with a bifurcated operating lever 19 fulcrumed on the platform, at 20, in a position to enable the upwardly extending arm 21 which constitutes the handle of the lever to be conveniently grasped and manipulated by the operator whose seat 22 is likewise supported on the platform. For the purpose of securing the lever and related parts in adjusted position, said lever is provided with a suitable stop member 23 engaging a notched segment 24. The shaft section 10 carries at its rear end a pinion 25 which may be placed in mesh with any one of a plurality of annular series of teeth 26 on a disk 27 which is mounted on a hind axle 5. It will be readily seen that by proper manipulation of the lever 19 the shaft section may be adjusted so as to cause the shaft S to be driven at various speeds. It will further be noted that the central portion of the face of the disk 27 is void of teeth, as best seen at 28 in Fig. 1. It is evident that by placing the pinion 25 in juxtaposition to the space 28 the rotation of the shaft S will be interrupted.

The main frame 1 is provided with guides 29 for the vertically movable hoe supporting frame F which consists of a yoke or arch, disposed longitudinally of the main frame at one side thereof and having side members 30 provided with ratchet teeth 31, said side members being connected by a crown or bridge piece 32 having a depending rack bar 33. The lower ends of the side members 30 are connected together by a rod 34. A bracket 35 supported on the platform 2 affords a bearing for a shaft 36 carrying a pinion 37 meshing with the rack bar 33 and a ratchet wheel 38. A lever 39 which is fulcrumed on the shaft 36 carries a pawl 40 that engages the ratchet wheel 38 to effect rotation of the latter and of the shaft carrying the pinion 37 which meshes with the rack bar 33, thereby enabling the frame F to be moved in an upward direction. The lever 39 which is extended in the direction of the driver's seat to enable it to be operated by the foot of the operator is supported in normal or raised position by means of a spring 41, best seen in Fig. 5.

For the purpose of retaining the frame F in a raised position, spring catches 42 are provided, said catches engaging the ratchet teeth 31 of the side members 30 of the frame. The catches 42 with their actuating springs 43 are inclosed in housings 44. For the purpose of disengaging the spring actuated catches 42 from the ratchet bars a lever 45 is provided, said lever being positioned intermediate the side members of the frame F and connected with the catches 42 by links or connecting members 46, one of which is connected with the lever above and the other below the fulcrum thereof, so that by rocking the said lever the spring catches will be simultaneously disengaged from the ratchets of the side bars, and thus permitting the frame F to drop by gravity. The downward movement of the frame is limited by stop members 47 engaging the top of the frame.

For the purpose of maintaining the lever 45 normally in an approximately upright position, a spring 48 is provided, as best seen in Fig. 5, said spring having a recess 49 to receive the lower extremity of the lever which is slightly rounded, as shown, so that while the spring will maintain the lever in an upright position, it will not obstruct the rocking movement thereof. The lever 45 is also connected with the pawl 40 by means of a suitable link 50, whereby, when the lever is rocked to disengage the catches 42 from the ratchets on the side bars of the frame F, the said pawl 40 will at the same time be lifted to a non-engaging position with respect to the ratchet wheel 38, permitting the latter to rotate freely while the frame F is moving in a downward direction.

The longitudinal shaft S is provided with cranks 51 with which the handles 52 of the hoes are pivotally connected. Said handles are preferably provided with boxes or bearings 53 including hinged members 54 which are capable of being secured by fastening means, such as bolts 55, which may be readily removed when, for any reason, it shall be desired to disengage the hoe handle from the cranks 51. The handles 52 are provided with longitudinal slots 56 engaging the rod 34 which is supported at the lower ends of the side members of the frame F, said rod being preferably mounted detachably in ears 57 at the lower ends of the side members 30 where it may be secured by means of a set screw 58. Blades 59 of any suitable kind are mounted at the outer ends of the hoe handles and substantially at right angles thereto.

In the operation of this invention it will be readily seen that by manipulating the lever 19, the shaft S may be caused to rotate at various speeds, thus transmitting motion to the hoes which, being actuated by the cranks, will engage the ground transversely of the row of plants that is being operated upon, thereby chopping out the superfluous plants and leaving stands at the proper intervals which may be regulated by the dimensions of the hoe blades. By properly adjusting the frame F the hoes will be made to engage the ground at the proper depth, or the frame F may be raised to such an extent as to lift the hoes to a non-engaging position. The general construction of the device is very simple and inexpensive, and the various working parts may be readily and easily controlled by the operator.

Having thus described the invention, what is claimed as new, is:—

1. In a cotton chopper, a wheel supported main frame having vertical guides, a vertically slidable frame engaging said guides, said frame having side members provided with ratchet teeth, an intermediately disposed rack bar and a rod supported at the lower ends of the side members, spring actuated catches engaging the ratchet teeth of the side members, a pinion engaging the rack bar, means including a pawl and ratchet for effecting step by step rotation of the pinion engaging the rack bar to elevate the frame, and means for retracting the spring actuated catches and the pawl to permit downward movement of the frame.

2. In a cotton chopper, a wheel supported main frame, a longitudinally disposed shaft having cranks, means for driving said shaft at various speeds, a longitudinally disposed frame guided for vertical movement, said frame having side members provided with ratchet teeth, an intermediately disposed rack bar and a rod supported detachably at the lower ends of the side members, hoes having handles provided with slots engaging the rod, said handles being pivotally connected with the cranks of the longitudinal shaft, spring actuated catches engaging the ratchet teeth of the side members of the frame to support the latter in adjusted position, stops to limit the downward movement of the frame, means for effecting adjustment of the frame including a pinion meshing with the rack bar, a shaft carrying said pinion, a ratchet wheel on the shaft, a spring supported foot lever pivoted on the shaft, and a pawl pivoted on the foot lever and engaging the ratchet wheel; and means for disengaging the supporting means of the frame including a lever, members connecting said lever with the spring actuated catches, and a link connecting said lever with the pawl.

In testimony whereof I affix my signature in presence of two witnesses.

SPURGEON BAXLEY.

Witnesses:
Wm. Bagger,
H. Littman.